US012761832B2

(12) United States Patent
Bert

(10) Patent No.: US 12,761,832 B2
(45) Date of Patent: Oct. 13, 2026

(54) DYNAMIC BUFFER MANAGEMENT FOR PARALLEL DATA PLACEMENT HANDLERS IN A DATA STORAGE DEVICE

(71) Applicant: Micron Technology, Inc., Boise, ID (US)

(72) Inventor: Luca Bert, Bologna (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/782,540

(22) Filed: Jul. 24, 2024

(65) Prior Publication Data

US 2026/0029950 A1 Jan. 29, 2026

(51) Int. Cl.
*G06F 3/06* (2006.01)

(52) U.S. Cl.
CPC .......... *G06F 3/0656* (2013.01); *G06F 3/0604* (2013.01); *G06F 3/0631* (2013.01); *G06F 3/0679* (2013.01)

(58) Field of Classification Search
CPC .... G06F 3/0656; G06F 3/0604; G06F 3/0631; G06F 3/0679
USPC .......................................................... 711/154
See application file for complete search history.

(56) References Cited

U.S. PATENT DOCUMENTS

| | | | | |
|---|---|---|---|---|
| 11,403,011 | B1 * | 8/2022 | Gunda | G06F 3/0679 |
| 2003/0179208 | A1 * | 9/2003 | Lavelle | G06T 15/005<br>345/539 |
| 2003/0218614 | A1 * | 11/2003 | Lavelle | G06T 15/005<br>345/503 |
| 2009/0300248 | A1 * | 12/2009 | Beaman | G06F 3/061<br>710/112 |
| 2016/0321072 | A1 * | 11/2016 | Cannata | G06F 3/0656 |
| 2017/0300250 | A1 * | 10/2017 | Sterns | G06F 3/0683 |
| 2018/0350296 | A1 * | 12/2018 | Thompson | G06F 3/0673 |
| 2019/0095134 | A1 * | 3/2019 | Li | G06F 3/061 |
| 2019/0155727 | A1 * | 5/2019 | Getta | G06F 12/109 |
| 2020/0210360 | A1 * | 7/2020 | Reghunath | G09G 5/026 |
| 2020/0379684 | A1 * | 12/2020 | Subbarao | G06F 3/0608 |
| 2022/0300198 | A1 * | 9/2022 | Gao | G06F 11/3409 |
| 2023/0236756 | A1 * | 7/2023 | Yu | H04L 49/9005<br>710/52 |

* cited by examiner

*Primary Examiner* — Than Nguyen
(74) *Attorney, Agent, or Firm* — Greenberg Traurig

(57) ABSTRACT

A memory sub-system having a first memory configured as a non-volatile storage medium of the memory sub-system; and a second memory having an access speed faster than the first memory. A processing device of the memory sub-system is configured to: run a plurality of data placement handlers concurrently; allocate a plurality of data buffers from the second memory to the plurality of data placement handlers respectively; reserve a plurality of backup spaces from the first memory for the plurality of data placement handlers respectively; allocate accumulation buffers from the second memory; and arrange the data placement handlers to time share the accumulation buffers via usages of the backup spaces.

19 Claims, 8 Drawing Sheets

DYNAMIC BUFFER MANAGEMENT FOR PARALLEL DATA PLACEMENT HANDLERS IN A DATA STORAGE DEVICE

TECHNICAL FIELD

At least some embodiments disclosed herein relate to memory systems in general, and more particularly, but not limited to memory systems configured with techniques to support host control of data placement, such as flexible direct placement (FDP), zoned namespace (ZNS).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Flexible direct placement (FDP) is a recently developed technology for a host system to write data into a memory sub-system. When a communication protocol supporting flexible direct placement is used, the host system can specify a data placement directive in a write command sent from the host system to the memory sub-system. The data placement directive instructs the memory sub-system to write data into a reclaim unit having a set of memory cells that are configured to be erased together.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
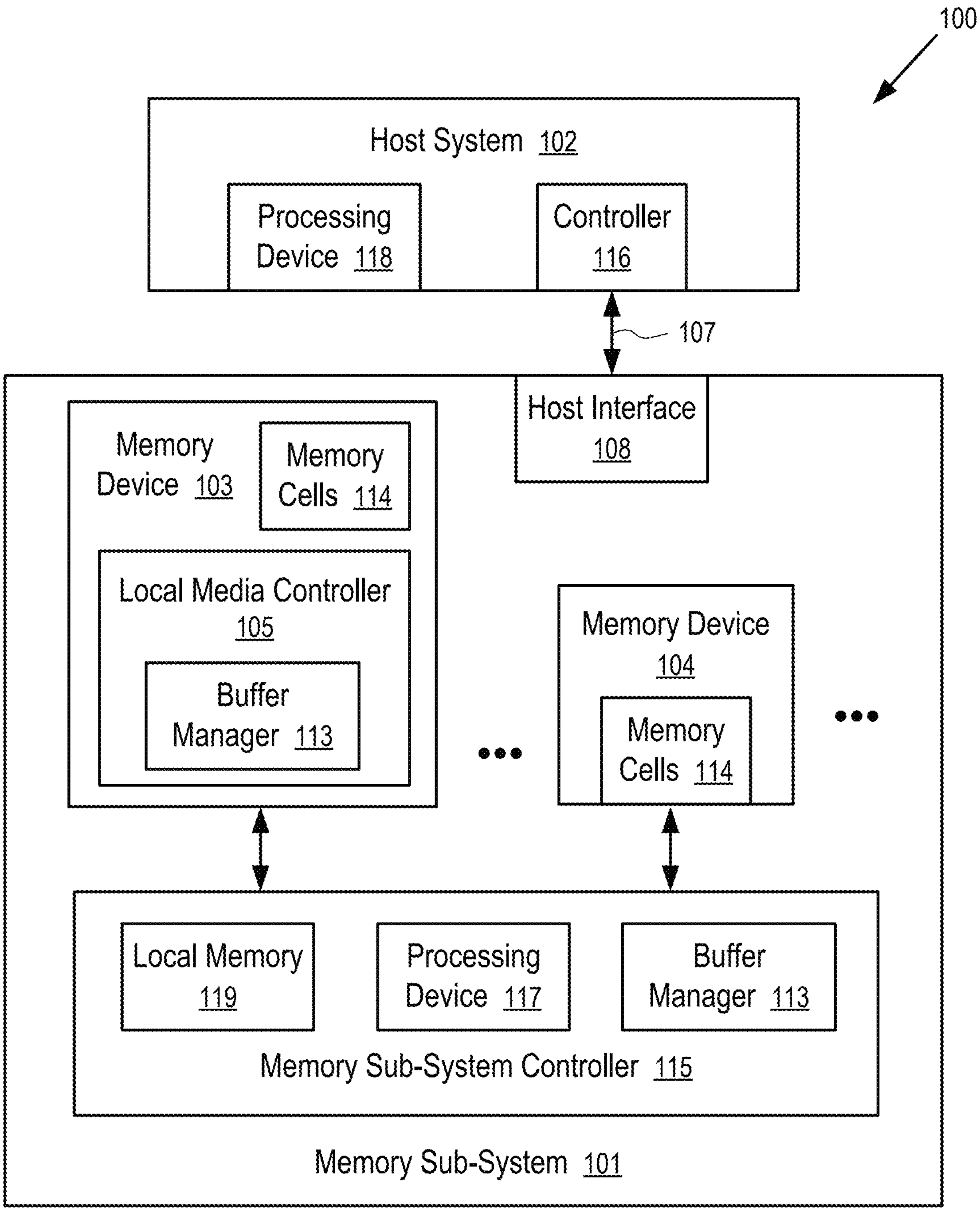
FIG. 1 illustrates an example computing system having a host system and a memory sub-system configured in accordance with some embodiments of the present disclosure.

At least some aspects of the present disclosure are directed to dynamic management of buffers allocated to data placement handlers in a memory sub-system, such as accumulation buffers configured to store the result of combining data (e.g., via XOR) to generate redundant information for improved reliability in data storage and retrieval.

A conventional memory sub-system can include a flash memory (e.g., NAND memory) that is to be in an erased state before being programmed to store data. For example, such a flash memory can include memory cells formed in an integrated circuit die and structured in pages of memory cells, blocks of pages, and planes of blocks. A page of memory cells is configured to be programmed together to store data in an atomic operation of programming memory cells. A block of memory cells can have a plurality of pages, which are configured to be erased together in an atomic operation of erasing memory cells. It is not operable to perform an operation to erase some pages in a block without erasing other pages in the same block. However, the pages in a block can be programmed separately. A plane of memory cells can have a plurality of blocks. In some implementations, planes of memory cells have the same structure such that a same operation (e.g., read, write) can be performed in parallel in multiple planes.

When a block of memory cells has some pages that can be erased and other pages that have valid data, the memory sub-system can perform the operation of garbage collection in which the valid data is copied from the block and written to outside of the block. After the valid data is copied to outside of the block, the entire block can be erased to reclaim the storage resources of the block without data loss. However, copying the valid data from a block for the purpose of erasing the block (so that the previously programmed pages in the block can be again programmed to store new data) increases the activities of programming memory cells to write data and thus leads to increased write amplification (e.g., the ratio between the amount of data being programmed to preserve host data in the storage media of the memory sub-system and the amount of the host data being preserved). Increased write amplification can reduce the performance of the memory sub-system and/or the useful life of the memory cells in the memory sub-system.

A conventional host system is configured to instruct a memory sub-system to store data at locations specified via logical addresses. The memory sub-system can have a flash translation layer configured to map the logical addresses as known to the host system to physical addresses of memory cells in the memory sub-system. As a result, the host system may not be aware which data items are stored in a block having pages configured to be erased together and thus may have fewer options in assisting the reduction of garbage collection and/or write amplification in the memory sub-system.

Flexible direct placement (FDP) is a recently developed technology that supports a communication protocol between a host system and a memory sub-system. With flexible direct placement (FDP), the host system can be aware of which data items are stored together in a unit of memory cells that are configured to be erased together during reclaiming storage resources in the memory sub-system. Such a unit can be referred to as a reclaim unit (RU) (e.g., as in flexible direct placement (FDP)).

Zoned namespace (ZNS) is another technique that provides the host system with a degree of control over the placement of data. Zoned namespace provides a zoned block storage interface between the host and a memory sub-system (e.g., solid-state drive (SSD)), that allows the memory sub-system to align the data to its storage media. A memory sub-system can use flexible data placement (FDP) and/or zone name space (ZNS) to implement a high degree of parallelism that allows the concurrent use of many storage regions/zones by a host system.

Each data placement handler or cursor can be allocated a separate set of resources for writing data to a separate storage region in the memory sub-system. Such resources can include a data buffer configured to receive data from the host system before the data is programmed by the data placement handler or cursor into a media for persistent storage.

Some memory sub-systems implements a technique of data protection via redundancy (e.g., redundant array of independent NAND (RAIN) or redundant arrays of independent disks (RAID)). To facilitate the efficient generation of the redundant information, the resources allocated to a data placement handler/cursor can further include an accumulation buffer. The accumulation buffer can be used by the data placement handler/cursor to store redundant information generated from prior data being written into the memory sub-system for combination with the new data to be written to generate updated redundant information. For example, the updated redundant information can be generated by applying an exclusive or (XOR) operation to the current data in the data buffer and the current content in the accumulation buffer to generate the updated content in the accumulation buffer. Thus, the accumulation buffer can have a size same as the data buffer. Allocation of a dedicated accumulation buffer to each data placement handler/cursor can double the usage of fast memory (e.g., static random access memory (SRAM)) in the memory sub-system. When a large number of data placement handlers/cursors are instantiated for running concurrently, the demand for the fast memory can become very high.

At least some aspects of the present disclosure address the above and other deficiencies and challenges by dynamically allocating accumulation buffers to the running data placement handlers/cursors on demand.

For example, a predetermined amount of fast memory (e.g., SRAM) in the memory sub-system can be configured as a number of accumulation buffers. When the number of data placement handlers in use is larger than the number of accumulation buffers, the large number of data placement handlers can time share the small numbers of accumulation buffers via the use of backup spaces in the storage media (e.g., NAND memory) of the memory sub-system.

For example, a region of the storage medium (e.g., NAND memory) of the memory sub-system can be reserved and configured in a single level cell (SLC) mode for fast programming and for improved endurance (e.g., higher program/erase (P/E) budget) than other modes. Each data placement handler can be assigned a backup space in the SLC region to hold the content of its accumulation buffer when the data placement handler is to temporarily have its accumulation buffer deallocated for use by another data placement handler. When the data placement handler is to perform an operation that involves the use of an accumulation buffer, an accumulation buffer can be deallocated from another data placement handler for reallocation to the data placement handler. The content in the backup space allocated to the data placement handler can be loaded into the accumulation buffer during the reallocation of the accumulation buffer to the data placement handler, as if the data accumulation buffer had been allocated to the data placement handler during the entire period between the last operation of the data placement handler using an accumulation buffer and the current operation of the data placement handler using an accumulation buffer. However, during the period, an accumulation buffer previously allocated to the data placement handler can be deallocated from the data placement handler for time sharing with another data placement handler to improve the usage rate of the accumulation buffer. Thus, the small number of accumulation buffers can be used to support the operations of a large number of data placement handlers/cursors running in a time period.

Examples of such data placement handlers/cursors include reclaim unit handles (RUHs) of a flexible direct placement (FDP) technique, and zone cursors of a zoned namespace (ZNS) technique.

Flexible direct placement (FDP) (or similar technologies) allows a host system to specify on which reclaim unit handle (RUH) data should be placed by a memory sub-system. A memory sub-system (e.g., a solid-state drive) supporting flexible direct placement (FDP) can expose, to a host system, a number of reclaim unit handles (e.g., 8 to 16 in most common cases but 100's or 1000's are possible). Each reclaim unit handle can independently buffer data received from the host system for writing the data to a separate reclaim unit. Different reclaim unit handles write data to different reclaim units. A number of reclaim unit handles can run simultaneously.

For a command sent to write data to the memory sub-system, the host system can specify, via a data placement directive of a write command, on which reclaim unit handle the data to be written should be placed. The memory sub-system can use the data placement directive to write the data on the specific cursor assigned to the reclaim unit handle. The cursor identifies a reclaim unit having a set of memory cells that are grouped together for erasure.

The use of the data placement directive allows the host system to aggregate data of likewise life on the same reclaim unit handle so that they will be deleted at about the same time to minimize the amount of garbage collection, resulting in improvements in both the performance and the endurance of the memory sub-system.

In general, reclaim units configured in a memory sub-system can have a same size known to the host system. A reclaim unit can have a plurality of blocks of memory cells. It is permissible for a host system to write logical blocks randomly into a reclaim unit; and logical blocks from different namespaces can be written into a same reclaim unit. Thus, the logical addresses of data stored in a reclaim unit can be random and/or configured in different namespaces. The flexibility offers improved opportunities for the host system to group data of likewise life for deletion at about the same time.

FIG. 1 illustrates an example computing system 100 that includes a memory sub-system 101 in accordance with some embodiments of the present disclosure. The memory sub-system 101 can include media, such as one or more volatile memory devices (e.g., memory device 104), one or more non-volatile memory devices (e.g., memory device 103), or a combination of such.

In general, a memory sub-system 101 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 102 that is coupled to one or more memory sub-systems 101. FIG. 1 illustrates one example of a host system 102 coupled to one memory sub-system 101. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 102 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 102 uses the memory sub-system 101, for example, to write data to the memory sub-system 101 and read data from the memory sub-system 101.

The host system 102 can be coupled (e.g., over a computer bus 107) to the memory sub-system 101 via a physical host interface 108. Examples of a physical host interface 108 include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface 108 can be used to transmit data between the host system 102 and the memory sub-system 101. The host system 102 can further utilize an NVM express (NVMe) interface to access components (e.g., memory devices 103) when the memory sub-system 101 is coupled with the host system 102 by the PCIe interface. The physical host interface 108 can provide an interface for passing control, address, data, and other signals between the memory sub-system 101 and the host system 102. FIG. 1 illustrates a memory sub-system 101 as an example. In general, the host system 102 can access multiple memory sub-systems via a same communication connection, multiple separate communication connections, and/or a combination of communication connections.

The processing device 118 of the host system 102 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 102 and the memory sub-system 101. In general, the controller 116 can send commands or requests to the memory sub-system 101 for desired access to memory devices 103, 104. The controller 116 can further include interface circuitry to communicate with the memory sub-system 101. The interface circuitry can convert responses received from the memory sub-system 101 into information for the host system 102.

The controller 116 of the host system 102 can communicate with the controller 115 of the memory sub-system 101 to perform operations such as reading data, writing data, or erasing data at the memory devices 103, 104 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 103, 104 can include any combination of the different types of non-volatile memory components and/or volatile memory components. The volatile memory devices (e.g., memory device 104) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 103 can include one or more arrays of memory cells 114. One type of memory cells, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 103 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells 114 of the memory devices 103 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 103 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), spin transfer torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 103 to perform operations such as reading data, writing data, or erasing data at the memory devices 103 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 101, including handling communications between the memory sub-system 101 and the host system 102.

In some embodiments, the local memory 119 can include memory registers storing memory pointers, fetched data, etc. The local memory 119 can also include read-only memory (ROM) for storing micro-code. While the example memory sub-system 101 in FIG. 1 has been illustrated as including the controller 115, in another embodiment of the present disclosure, a memory sub-system 101 does not include a controller 115, and can instead rely upon external control (e.g., provided by an external host, or by a processor or controller separate from the memory sub-system).

In general, the controller 115 can receive commands or operations from the host system 102 and can convert the commands or operations into instructions or appropriate commands to achieve the desired access to the memory devices 103. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 103. The controller 115 can further include host interface circuitry to communicate with the host system 102 via the physical host interface 108. The host interface circuitry can convert the commands received from the host system into command instructions to access the memory devices 103 as well as convert responses associated with the memory devices 103 into information for the host system 102.

The memory sub-system 101 can also include additional circuitry or components that are not illustrated. In some embodiments, the memory sub-system 101 can include a cache or buffer (e.g., DRAM) and address circuitry (e.g., a row decoder and a column decoder) that can receive an address from the controller 115 and decode the address to access the memory devices 103.

In some embodiments, the memory devices 103 include local media controllers 105 that operate in conjunction with the memory sub-system controller 115 to execute operations on one or more memory cells of the memory devices 103. An external controller (e.g., memory sub-system controller 115) can externally manage the memory device 103 (e.g., perform media management operations on the memory device 103). In some embodiments, a memory device 103 is a managed memory device, which is a raw memory device combined with a local controller (e.g., local media controller 105) for media management within the same memory device package. An example of a managed memory device is a managed NAND (MNAND) device.

The controller 115 and/or a memory device 103 can include a buffer manager 113 configured to perform operations related to deallocation and reallocation of buffers to data placement handlers in the memory sub-system 101. In some embodiments, the controller 115 in the memory sub-system 101 includes at least a portion of the buffer manager 113. In other embodiments, or in combination, the controller 116 and/or the processing device 118 in the host system 102 includes at least a portion of the buffer manager 113. For example, the controller 115, the controller 116, and/or the processing device 118 can include logic circuitry implementing the buffer manager 113. For example, the controller 115, or the processing device 118 (processor) of the host system 102, can be configured to execute instructions stored in memory for performing the operations of the buffer manager 113 described herein. In some embodiments, the buffer manager 113 is implemented in an integrated circuit chip disposed in the memory sub-system 101. In other embodiments, the buffer manager 113 can be part of firmware of the memory sub-system 101, an operating system of the host system 102, a device driver, or an application, or any combination therein.

For example, the buffer manager 113 implemented in the controller 115 and/or 105 of the memory sub-system 101 can be configured to perform the operations to manage the buffers (e.g., accumulation buffers) allocated to data placement handlers running in the memory sub-system 101, as further discussed below.

For example, the memory sub-system 101 can be configured with enough resources (e.g., SRAM in local memory 119) to run 16 or 32 data placement handlers (e.g., reclaim unit handles of flexible data placement (FDP) or zone cursors of zoned namespace (ZNS)). The data placement handlers can process related XOR data for improved data storage reliability. The techniques discussed herein allow the limited resources to support the memory sub-system 101 running 64, 128 or even more data placement handlers. Power consumption and the capacity of a typical power supply unit for the memory sub-system 101 would prevent the memory sub-system 102 from running a massive number (e.g., over 1000) of data placement handlers in parallel.

When there are sufficient resources (e.g., SRAM) available in the memory sub-system 101 for running a small number (e.g., 16 to 32) of data placement handlers, the buffer managers 113 can allocate both a data buffer and an accumulation buffer for each open data placement handler (e.g., reclaim unit handles of flexible data placement or zones of zoned namespace).

As the number of open data placement handlers increases, there are insufficient resources (e.g., SRAM) to instantiate a data buffer and an accumulation buffer for each open data placement handler. The open data placement handlers can each have a separate, dedicated data buffer, and can be configured to time share a number of accumulation buffers.

The techniques disclosed herein explore write patterns locality to enable the time sharing without significant degradation in performance. System architecture and data workload traces of typical usages suggest that not all of the open data placement handlers are used in parallel all the time.

For example, there can be 128 open data placement handlers (e.g., reclaim unit handles of flexible data placement or zones of zoned namespace) running the memory sub-system 101. However, typical usages involve the use of a subset of them (e.g., 16 to 32 of the 128 open data placement handlers) within a given time period. Such an experimental observation can be used to support the viability of the solution configured with time sharing of a small number of accumulation buffers (e.g., 16 to 32) by a large number of open data placement handlers (e.g., 128).

The accumulation buffers can be dynamically allocated and reallocated to open data placement handlers on demand.

For example, the memory sub-system 101 can be configured with 128 data buffers implemented using SRAM but only 16 accumulation buffers implemented using SRAM. The buffer managers 113 are configured to dynamically allocate, on demand, the accumulation buffers to the data placement handlers that need the accumulation buffers the most.

For example, when data placement handler 0 to 15 are active, the 16 accumulation buffers are mapped 1:1 to the data placement handlers 0 to 15. If, at a point, data placement handler 92 becomes active, the memory sub-system 101 can free up one of the accumulation buffers from one of the data placement handlers 0 to 15, clean it up, and allocate it to the data placement handler 92. The accumulation buffer of which of the data placement handler 0 to 15 is freed up/deallocated and how the cleanup works are further discussed below.

Which of data placement handlers 0 to 15 should relinquish its accumulation buffer can be determined in a way similar to the eviction mechanism of cache controllers. In a way the content of an accumulation buffer can be considered the cached version of accumulation data in a backup space allocated for a respective data placement handler. The memory sub-system can use statistical methods to pick an accumulation buffer for eviction and flush the content of the accumulation buffer to the backup space reserved for the respective data handler.

For example, accumulation buffer access locality (e.g., frequently and how long ago an accumulation buffer is access by each data placement handler) can be used to select a victim data placement handler for the deallocation of the accumulation buffer currently allocated to the victim data placement handler. For example, the accumulation buffer eviction can be based on which of the accumulation buffers has been last used at a time that has a longest elapse time to the current time. Optionally, the buffer manager 113 can use the last use time as one of many eviction policies for the selective deallocation of accumulation buffers.

A space in NAND SLC pages can be reserved to dump the content of accumulation buffers during deallocation based on demand for reallocation of accumulation buffers.

For example, the memory sub-system 101 can run 128 data placement handlers and is configured with sufficient SRAM for 16 accumulation buffers. The buffer manager 113 in the memory sub-system 101 can reserve a space in SLC NAND (e.g., in memory cells 114) sufficient for the accumulation buffer contents of the 128 data placement handlers, and reserve a space in the SRAM (e.g., in local memory 119) sufficient for 16 accumulation buffers. Each of the 128 data placement handlers is assigned an SLC backup space that can be indexed as the persistent storage space of the accumulation buffer content of the respective data placement handler.

When an accumulation buffer is to be reassigned from one data placement handler to another, the content of the accumulation buffer is written into the backup space assigned to the data placement handler from which the accumulation buffer is deallocated; and the content in the backup space assigned to the data placement handler to which the accumulation buffer is allocated is read into the accumulation buffer.

During an asynchronous power loss (APL) event, the content of all of the accumulation buffers can be written to the corresponding backup spaces of the data placement handlers to which the accumulation buffers are currently assigned. Thus, the accumulation buffer contents can be preserved in the backup spaces to go through the APL event without a need to perform intermediate mapping.

Further details of the operations of the buffer managers 113 in the memory sub-system 101 are discussed below.

Figure 2:
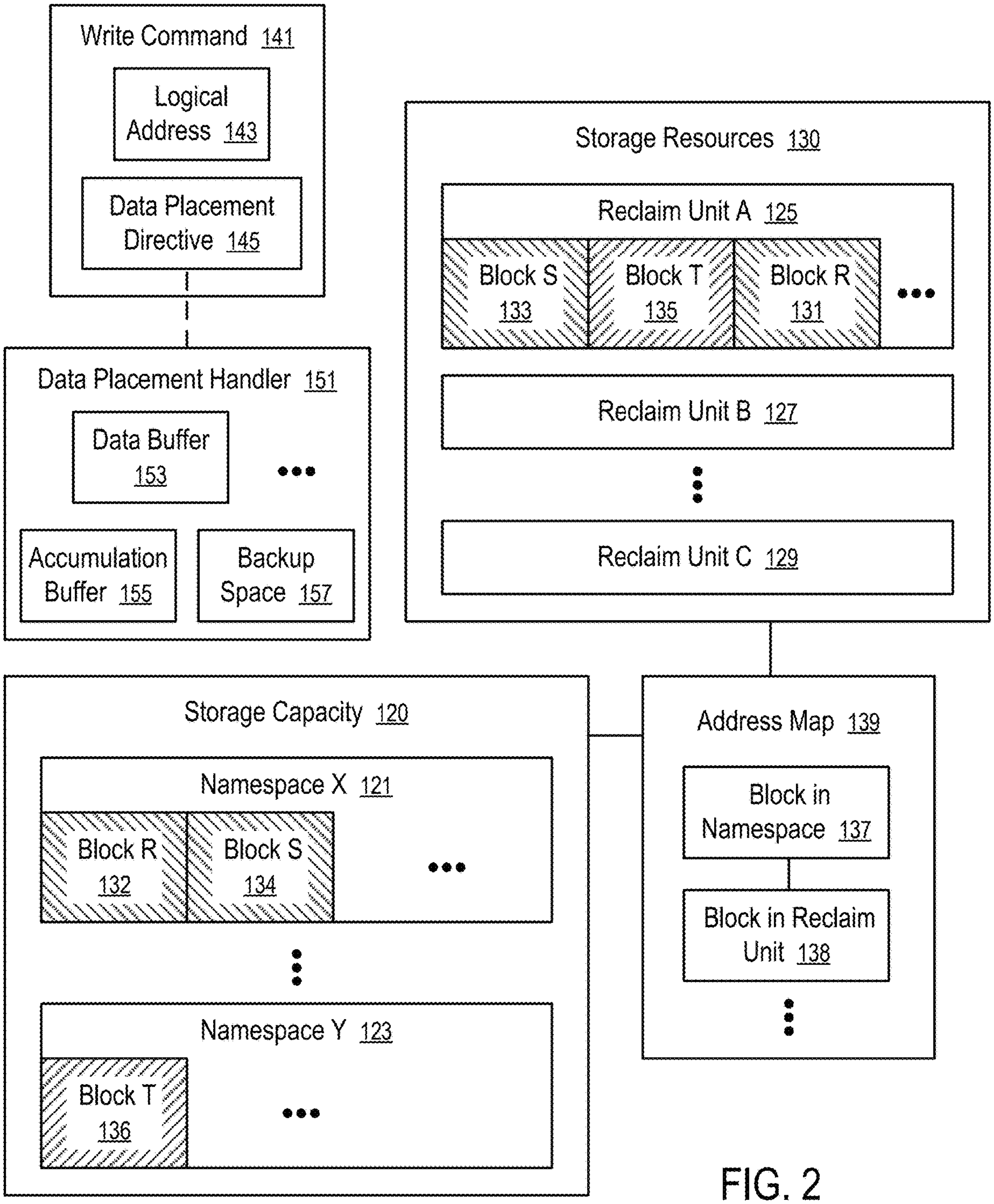
FIG. 2 shows a data placement handler in a memory sub-system according to one embodiment.

FIG. 2 shows a data placement handler in a memory sub-system according to one embodiment. For example, the data placement handler 151 of FIG. 2 can be implemented in the memory sub-system 101 of the computing system of FIG. 1 and configured by the buffer managers 113.

In FIG. 2, the data placement handler 151 (sometime referred to as a data placement cursor) is configured to place data into a physical region of storage media in the memory sub-system 101 in accordance with a write command 141 from the host system 102 using a flexible data placement (FDP) technique.

The physical region of storage media managed by the data placement handler is typically larger than the storage space represented by a logical address 143. The host system 102 can use a data placement directive 145 to identify the physical region such that the data stored at the logical address 143 is known to the host system 102 to be grouped with other data stored at other logical addresses that are written to the same physical region as specified by the host system 102.

In general, a memory sub-system 101 can expose multiple such host identifiable physical regions to allow the host system 102 to specify the data placement among the different physical regions. Since the host system 102 can use more than one physical region during a time period in parallel, the memory sub-system 101 can instantiate multiple data placement handlers (e.g., 151), each configured to control data placement in a separate physical region.

A typical data placement handler 151 can be assigned a set of resources for its operation, such as a data buffer 153, an accumulation buffer 151, a backup space 157, etc.

The data buffer 153 can be used by the data placement handler 151 to buffer the data of the write command 141 for programming into the non-volatile storage media (e.g., memory cells 114 implemented using NAND) of the memory sub-system 101.

The accumulation buffer 155 can be used by the data placement handler 151 to buffer results that are the accumulative operations of applying a function (e.g., XOR) to the previous result and the current content in the data buffer 153.

For improved performance, the data buffer 153 and the accumulation buffer 155 can be allocated from local memory 119 (e.g., implemented using SRAM or DRAM) configured in the memory sub-system 101.

When there are many data placement handlers (e.g., 151) running in the memory sub-system 101, the memory sub-system 101 may not have sufficient resources to allocate an accumulation buffer 155 to each of the data placement handlers (e.g., 151) at the same time. The data placement handlers (e.g., 151) running in the memory sub-system 101 can time share the accumulation buffers (e.g., 155) available in the memory sub-system 101.

Each of the running data placement handlers (e.g., 151) can be allocated a backup space 157 sufficient to store the content of an accumulation buffer (e.g., 155).

To deallocate the accumulation buffer 155 from the data placement handler 151 for reallocation to another data placement handler, the buffer manager 113 of the memory sub-system 101 can write the current content of the accumulation buffer 155 to the backup space 157.

To reallocate/allocate the accumulation buffer 155 to the data placement handler 151 (e.g., after deallocation from another data placement handler), the buffer manager 113 of the memory sub-system 101 can retrieve the current content of the backup space 157 into the accumulation buffer 155.

The backup space 157 can be implemented using a resource (e.g., NAND memory) that is less expensive than the local memory 119 (e.g., SRAM or DRAM). For example, a region of the non-volatile memory cells 114 can be reserved and operated in a SLC mode to provide the backup space 157.

The memory sub-system 101 (e.g., as in FIG. 1) can maintain an address map 139 that is configured to identify the mapping between logical blocks (e.g., 137) defined in namespaces (e.g., 121, . . . , or 123) and physical blocks (e.g., 138) of storage resources (e.g., memory cells) that are currently allocated as storage media to store the data of the logical blocks (e.g., 137).

The memory sub-system 101 has a storage capacity 120 (e.g., storage capability provided by memory cells 114 in the memory devices 103, . . . , 104 in the memory sub-system 101 illustrated in FIG. 1). Using a technique of flexible data placement different portions of the storage capacity 120 can be allocated to different namespaces (e.g., 121, . . . , 123). Within each namespace (e.g., 121 or 123), logical block addresses can be defined sequentially, starting from zero. The namespaces (e.g., 121, . . . , 123) and the logical block addresses defined in the namespaces (e.g., 121, . . . , 123) allow a host system 102 (e.g., as in FIG. 1) to specify the location of writing a block of data into the memory sub-system 101 or reading the block of data.

The memory sub-system 101 has physical storage resources (e.g., memory cells 114 in the memory devices 103, . . . , 104 in the memory sub-system 101 illustrated in FIG. 1). For example, the memory cells 114 in the memory sub-system 101 can be physically structured in pages of memory cells, blocks of pages, and planes of blocks.

The memory sub-system 101 can organize or group of storage resources (e.g., blocks of memory cells) into a reclaim unit (e.g., 125, 127, . . . , or 129) such that the memory cells in a reclaim unit can be erased together, before the storage resources can be programmed again to store new data. For example, the memory cells in each reclaim unit (e.g., 125, 127, . . . , or 129) can be erased without erasing any memory cells outside of the reclaim unit (e.g., 125, 127, . . . , or 129).

To store a block of data at a logical block address (e.g., corresponding to block 134 defined in the namespace 121), the memory sub-system 101 can allocate a block 133 of storage resources in the reclaim unit 125 as the media for the logical block 134. For example, the block 133 of storage resources can be one or more pages of memory cells allocated from one or more blocks of pages. In a typical implementation, the data size of the block 132 in the namespace 121 (e.g., identify via a logical block address defined in the namespace 121) is smaller than the storage capacity of a block of pages that are structured/wired to be erased together. Thus, the block 133 of storage resource in the reclaim unit 125 is not necessarily an entire block of pages.

The data of the logical block 132 in the namespace 121 can be stored in the media/storage resources in the block 133 of the reclaim unit 125. For example, to store the data, one or more pages of memory cells allocated as the block 133 of storage resources 130 can be programmed to have states (e.g., threshold voltage levels) that represent the data stored in the memory cells. The block of data can be retrieved from the media via a read command identifying the logical block address of the block 134 in the namespace 121. For example, the states (e.g., threshold voltage levels) that represent the data stored in the memory cells can be examined in a read operation to determine the data stored in the memory cells.

Instead of using a predetermined relation between the block 134 in the namespace 121 and the block 133 in the reclaim unit 125, the memory sub-system 101 maintains the address map 139 to indicate that the media of the block 134 in the namespace 121 is the block 133 in the storage resources 130. Using the address map 139, the memory sub-system 101 can translate (e.g., via a flash translation layer of the memory sub-system 101) the logical block address of the block 134 in the namespace 121 to the physical address of the block 133 in the storage resources 130.

Using a communication protocol supporting flexible direct placement (FDP), the host system 102 can write blocks (e.g., 134, 136) of different namespaces (e.g., 121, 123) into a same reclaim unit (e.g., 125). Further, the host system 102 can write blocks of a namespace (e.g., 121 or 123) into a reclaim unit (e.g., 125) in a random order, instead of sequentially.

The memory sub-system 101 has a degree of flexibility in allocating blocks of storage resources (e.g., memory cells) to a reclaim unit (e.g., 125). For example, the blocks (e.g., 131, 133, 135) of storage resources do not have to be a contiguous section of memory cells on an integrated circuit die. The blocks (e.g., 131, 133, 135) of storage resources can be allocated from different planes and/or integrated circuit dies. However, the blocks of storage resources allocated to each reclaim unit (e.g., 125) are such that the reclaim unit (e.g., 125) is erasable without erasing any storage resources outside of the reclaim unit (e.g., 125).

Using a protocol supporting flexible direct placement (FDP), the host system 102 can specify a data placement directive 145 in a write command 141 to request the use of a reclaim unit handle (e.g., data placement handler 151) operating on the reclaim unit 125 to store data provided by the host system 102. With the data placement directive 145, the host system 102 can write to the block 134 in the namespace 121, causing the block 133 in the reclaim unit 125 to be used as the media for the block 134 and thus mapped accordingly in the address map 139. For example, in the address map 139, block 137 can identify block 134 in the namespace 121; and the associated block 138 can identify the physical block 133 in the reclaim unit 125 as the media of the logical block 134 in the namespace.

Subsequently, the host system 102 can use the same reclaim unit handle (e.g., data placement handler 151) to write to the block 136 in a different namespace 123, causing the subsequent block 135 in the reclaim unit 125 to be used as the media for the block 136 in the namespace 123. Since the host system 102 uses the same reclaim unit handle to write the block 134 in the namespace 121 and the block 136 in the namespace 123, the host system 102 knows that the blocks 134 and 136 are stored into the same reclaim unit 125. For example, when the host system 102 determines that the blocks 134 and 136 have likewise life, the host system 102 can use the same reclaim unit handle to place their data together in a same reclaim unit 125. For example, the data of the blocks 134 and 136 can be from different storage space tenants.

Subsequently, the host system 102 can further use the same reclaim unit handle (e.g., data placement handler 151) to write to the block 132 in the namespace 121, causing the block 131 in the reclaim unit 125 to be used as the media for the block 132. Thus, the reclaim unit 125 can host data of different namespaces (e.g., 121, 123) in a random order.

FIG. 2 illustrates the dynamic management of accumulation buffers (e.g., 155) for data placement handlers (e.g., 151) configured to place data in storage media (e.g., memory cells 114) according to a technique of flexible data placement (FDP) (e.g., reclaim unit handle). The techniques can also be used to manage accumulation buffers (e.g., 155) for data placement handlers of other types, such as the cursor of a zone implemented using a technique of zoned namespace (ZNS).

Zoned namespace (ZNS) is less flexible than flexible data placement (FDP). For example, a zone is specific to a particular namespace; and random writes to the zone is not permitted. However, multiple zones can operate in parallel, just like the parallel operation of reclaim unit handles of flexible data placement (FDP).

Figure 3:
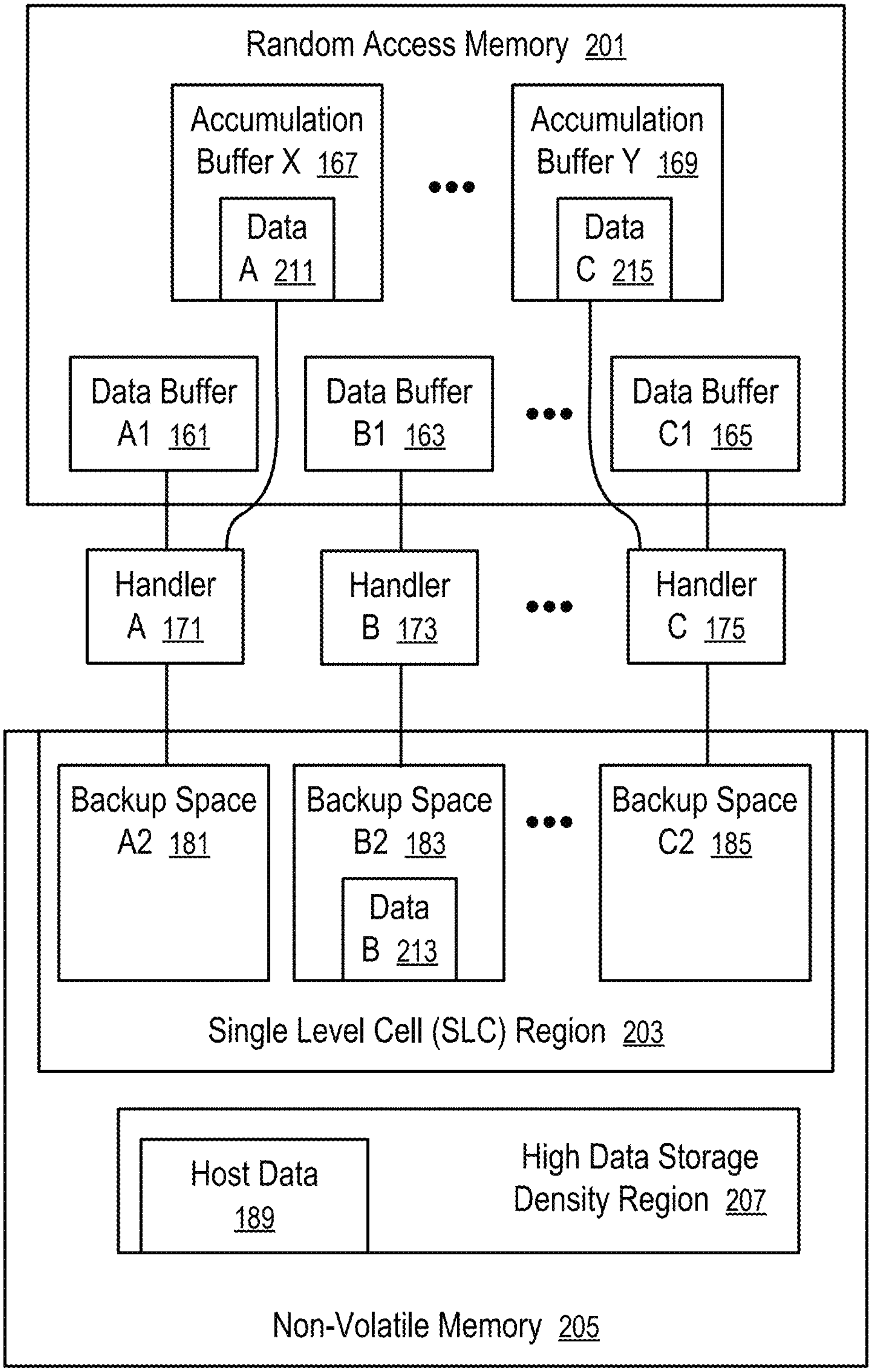
FIG. 3 to FIG. 5 shows an example of dynamically allocating an accumulation buffer to different data placement handlers according to one embodiment.
Figure 4:
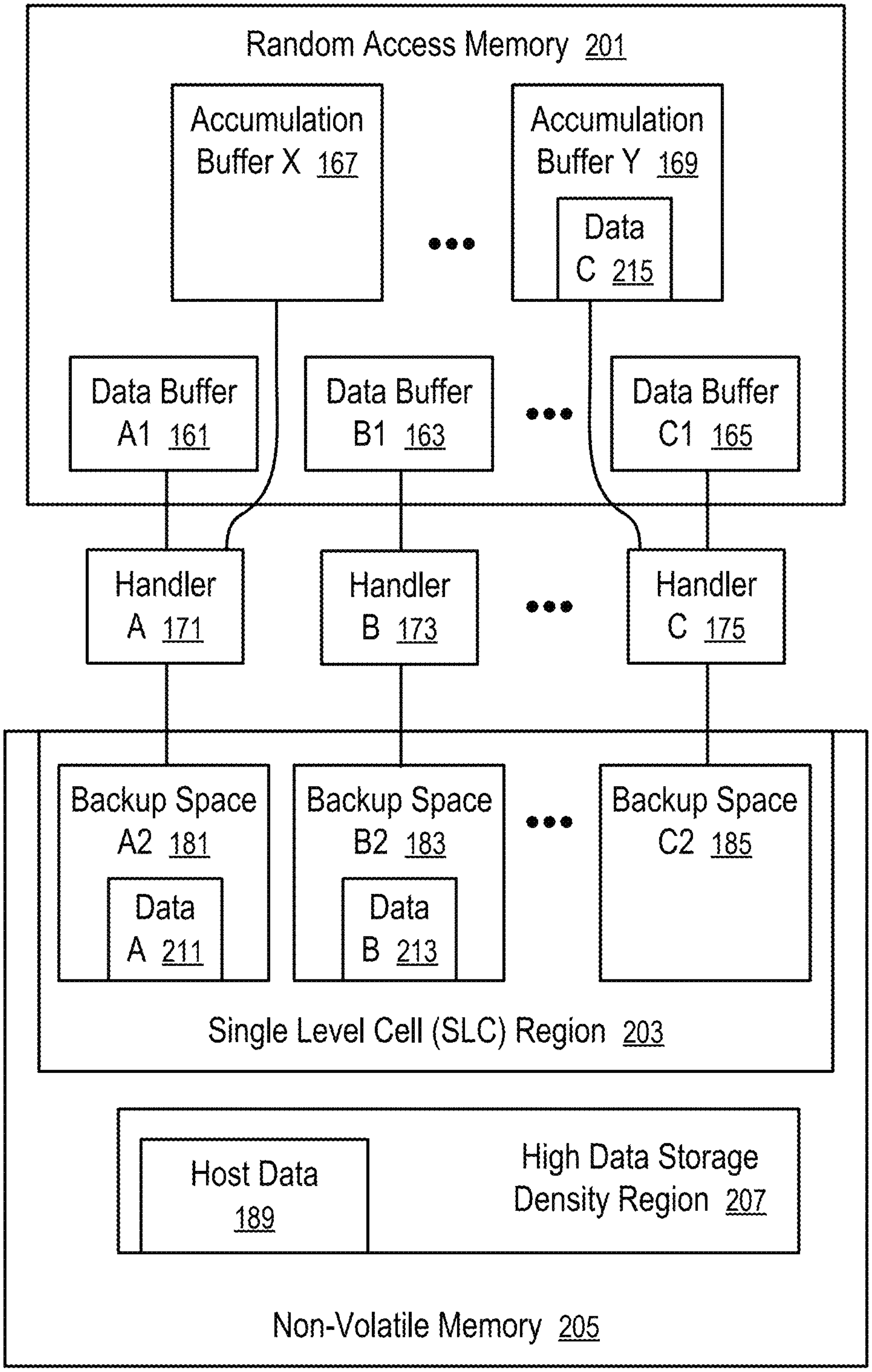
Figure 5:
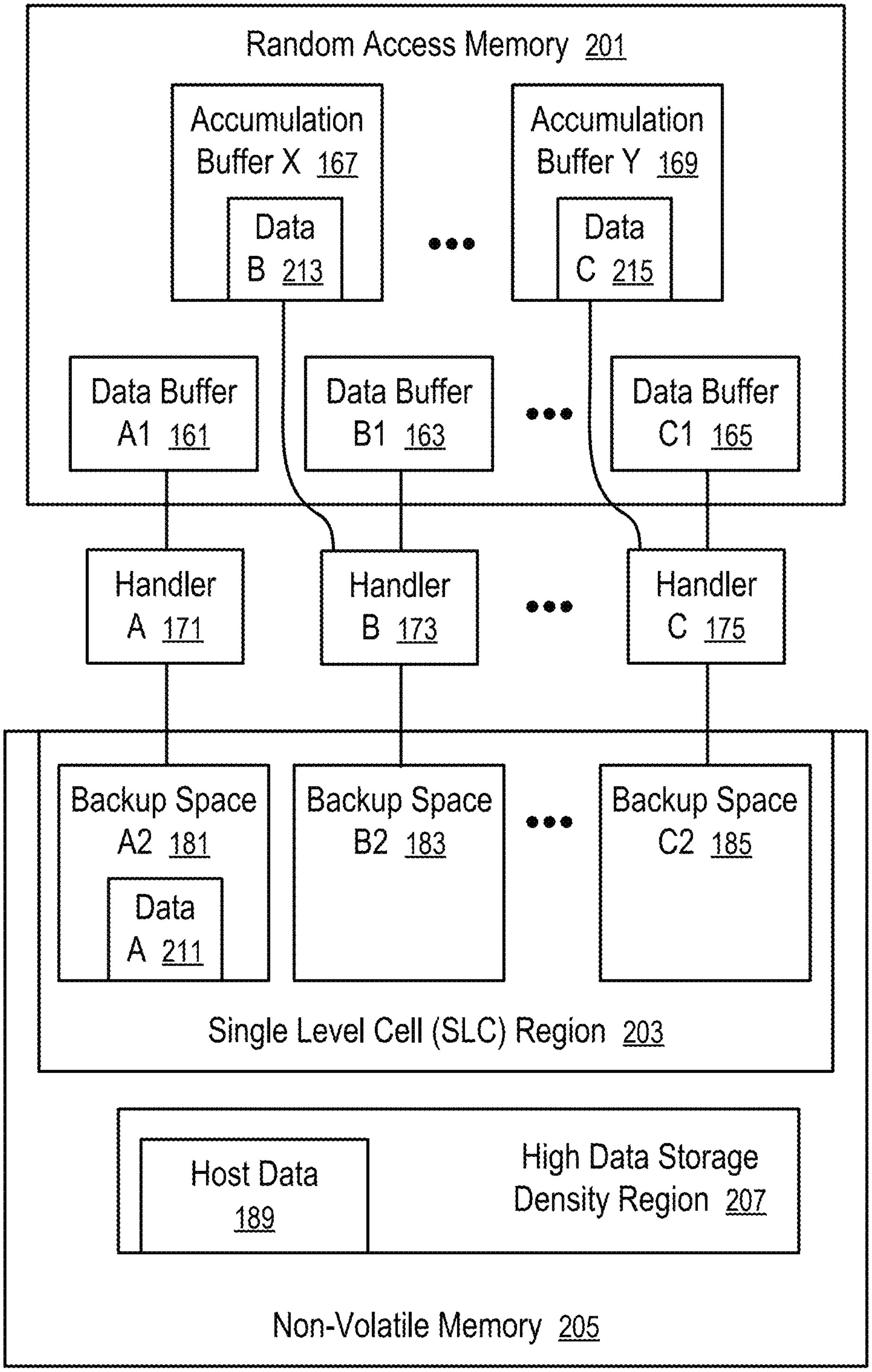

FIG. 3 to FIG. 5 shows an example of dynamically allocating an accumulation buffer to different data placement handlers according to one embodiment.

For example, the data placement handlers 171, 173, . . . , and 175 in FIG. 3 to FIG. 6 can run in the memory sub-system 101 of the computing system 100 of FIG. 1, where each data placement handler can be configured to operate in a way as in FIG. 2.

In FIG. 3 to FIG. 6, a random access memory 201 (e.g., SRAM, DRAM) is configured in the memory sub-system 101 (e.g., as local memory 119) to implement data buffers 161, 163, . . . , and 165 and accumulation buffers 167, . . . , and 169.

Each of the data placement handlers 171, 173, . . . , and 175 running in the memory sub-system 101 has a dedicated data buffer (e.g., 161, 163, . . . , or 165). Thus, the number of handlers 171, 173, . . . , and 175 running in the memory sub-system 101 is equal to the number of data buffers 161, 163, . . . , and 165 configured in the random access memory 201.

The number of accumulation buffers 167, . . . , and 169 that can be supported by the random access memory 201 is typically smaller than the number of running data placement handlers 171, 173, . . . , and 175. Thus, there are not enough accumulation buffers 167, . . . , and 169 for dedicated allocation to the handlers 171, 173, . . . , and 175 such that each handler has its own, dedicated accumulation buffer.

The buffer manager 113 in the memory sub-system 101 is configured to dynamically deallocate and reallocate the accumulation buffers 167, . . . , and 169 to the handlers 171, 173, . . . , and 175 on demand.

In FIG. 3, the accumulation buffers 167, . . . , and 169 are allocated to a subset of the handlers (e.g., 171, 175) that are actively performing, or have been recently performing, operations that use accumulation buffers. Some handlers (e.g., 173) that are not actively performing such operations can have no accumulation buffer being currently allocated to such handlers (e.g., 173).

For example, when the data buffer 161 receives from the host system 102 data to be written into the non-volatile memory 205 (e.g., implemented via memory cells 114 in the memory devices 103, 104), the data placement handler 171 can perform an operation (e.g., XOR) to combine the data in the data buffer 161 and the data 211 in the accumulation buffer 167 to update the data 211 in the accumulation buffer 167.

Similarly, when the data buffer 165 receives from the host system 102 data to be written into the non-volatile memory 205, the data placement handler 175 can perform an operation (e.g., XOR) to combine the data in the data buffer 165 and the data 215 in the accumulation buffer 169 to generate an updated version of the data 215 in the accumulation buffer 169.

When the host system 102 sends a write command 141 with a data placement directive 145 that causes the data placement handler 173 to write data to the non-volatile memory 205, the buffer manager 113 in the memory sub-system 101 can dynamically deallocate an accumulation buffer (e.g., 167) from a handler (e.g., 171) and reallocate the accumulation buffer (e.g., 167) to the handler 173.

For example, the buffer manager 113 can track the timestamps of the last operations of the handlers (e.g., 171, 175) that currently have accumulation buffers (e.g., 167, . . . , and 169) allocated to them. If the handler 171 has the oldest timestamp for using its accumulation buffer 167, the buffer manager 113 can decide to deallocate the accumulation buffer 167 from the handler 171 for reallocation to the handler 173.

For example, the buffer manager 113 can track a predetermined number of timestamps of the last operations of a handler (e.g., 171) to predict/estimate a time of its next use of its accumulation buffer 167. When the predicted/estimated time of next use for the handler 171 is the furthest in the future, among the handlers (e.g., 171, 175) that currently have accumulation buffers (e.g., 167, . . . , and 169), the buffer manager 113 can decide to deallocate the accumulation buffer 167 from the handler 171 for reallocation to the handler 173.

For example, the buffer manager 113 can track the frequencies of the handlers 171, 173, . . . , 175 in using their applicated accumulation buffers 167, . . . , 169. When the handler 171 has the least frequent use of its accumulation buffer 167, the buffer manager 113 can decide to deallocate the accumulation buffer 167 from the handler 171 for reallocation to the handler 173.

In some implementations, the eviction policy for selecting a handler (e.g., 171) for deallocating its accumulation buffer (e.g., 167) can be based on a number of factors, such as time of recorded last use, time of predicted next use, frequency of use, etc.

To deallocate the accumulation buffer 167 from the handler 171, the buffer manager 113 can write the current data 211 in the accumulation buffer 167 into a backup space 181 allocated to the handler 171.

In FIG. 3 to FIG. 6, each of the handlers 171, 173, . . . , and 175 has a dedicated backup space (e.g., 181, 183, . . . , or 185) reserved in a region 203 in the non-volatile memory 205.

For example, the non-volatile memory 205 can be implemented via NAND memory cells; and the region 203 can be configured to store data in a single level cell (SLC) mode for improved speed in write operations and for improved endurance that allows a number of program/erase cycles than other modes (e.g., MLC, TLC, QLC, or PLC). In contrast, the non-volatile memory 205 has a high data storage density region 207 configured to store host data 189 (e.g., provided by the host system 102 in connection with write commands) in a different mode (e.g., MLC, TLC, QLC, or PLC) for enlarged storage capacity.

FIG. 4 illustrates the storing of the data 211, which is in the accumulation buffer 167 in FIG. 3, to the backup space 181 of the handler 171 for the deallocation of the accumulation buffer 167 from the handler 171. Optionally, the accumulation buffer 167 can be cleared/erased before its reallocation to the handler 173.

FIG. 5 illustrates the preparation of the accumulation buffer 167 for reallocation to the handler 173, during which the data 213 in the backup space 183 allocated to the handler 173 is retrieved into the accumulation buffer 167.

Optionally, after the data 213 is retrieved into the accumulation buffer 167 and/or after the accumulation buffer 167 is used by the handler 173 in an operation that updates the content in the accumulation buffer 167, the buffer manager 113 can erase the backup space 183 to prepare the backup space 183 for storing the content of the accumulation buffer 167 (e.g., when the accumulation buffer 167 is to be deallocated from the handler 173).

For example, when the buffer manager 113 decides to reallocate the accumulation buffer 167 from the handler 173 to the handler 171, the current data 213 is in the accumulation buffer 167 can be written into the backup space 183 of the handler 173; and the data 211 in the backup space 181 of the handler 171 can be retrieved into the accumulation buffer 167 for reallocation to the handler 171 in a way as in FIG. 3.

Figure 6:
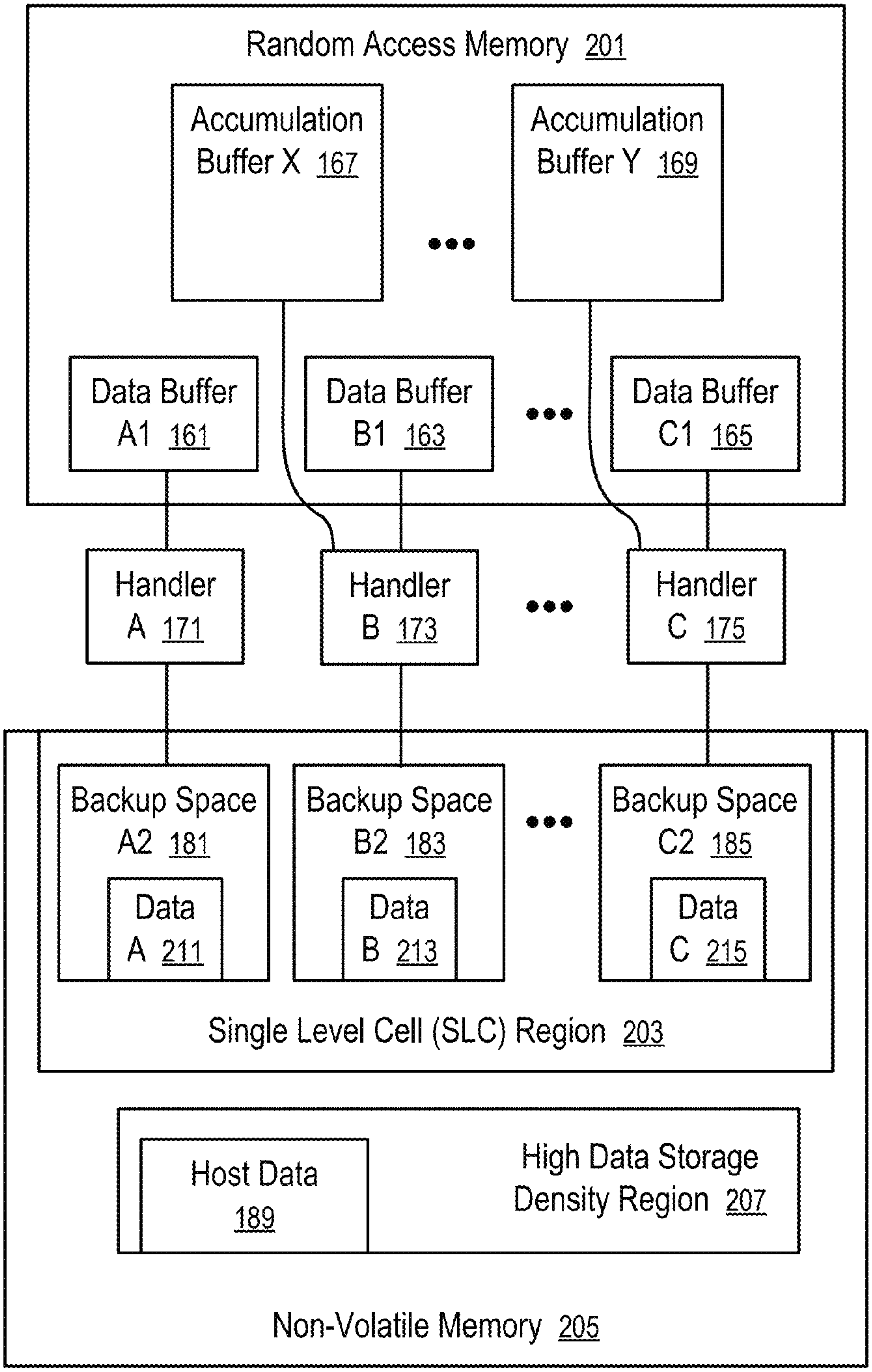
FIG. 6 illustrates the deallocation of accumulation buffers in response to a power outage event according to one embodiment.

FIG. 6 illustrates the deallocation of accumulation buffers in response to a power outage event according to one embodiment.

For example, the random access memory 201 in FIG. 3 to FIG. 6 can be implemented via a volatile memory (e.g., SRAM or DRAM) for improved access speed. In response to a power outage event (e.g., asynchronous power loss) when the accumulation buffers 167, . . . , and 169 are allocated to handlers 173, . . . , and 175 in a way as illustrated in FIG. 5, the buffer manager 113 can write the data 213, . . . , and 215 from the accumulation buffers 167, . . . , and 169 to the backup spaces 183, . . . , 185 of the respective handlers 173, . . . , and 175 for preservation through the power outage. After writing the contents (e.g., data 211, . . . , 215) of the accumulation buffers 167, . . . , 169 to the respective backup spaces 183, . . . , 185, the accumulation buffers 167, . . . , 169 are deallocated.

Upon restoration of power supply to the memory sub-system 101, the buffer manager 113 can retrieve the data 213, . . . , 215 from the backup spaces (e.g., 183, . . . , 185) of handlers (e.g., 173, . . . , 175) into the accumulation buffers 167, . . . , 169 for allocation to the handlers (e.g., 173, . . . , 175). The buffer manager 113 can restore the allocation to that is immediately before the power outage event. Alternatively, the buffer manager 113 can reallocate the accumulation buffer in accordance with the run-time demand for accumulation buffers after the power outage event.

Optionally, the backup spaces 181, 183, . . . , 185 can be configured to have a size sufficient to also store the data in the data buffers 161, 163, . . . , and 165. In response to a notification of an asynchronous power loss (APL) event, the buffer manager 113 can store the contents of both the data buffers 161, 163, . . . , and 165 and the accumulation buffers 167, . . . , and 169 to the backup spaces 181, 183, . . . , 185.

Optionally, the buffer manager 113 can randomize the assignment of backup spaces 181, 183, . . . , 185 to the handlers 171, 173, . . . , and 175 to level wearing in the region 203. The buffer manager 113 can randomize the assignment of portions of a backup space (e.g., 181, 183, . . . , or 185) to a data buffer and an accumulation buffer 167 allocated to a respective handler (e.g., 171, 173, . . . , or 175) to level wearing in the region 203.

Figure 7:
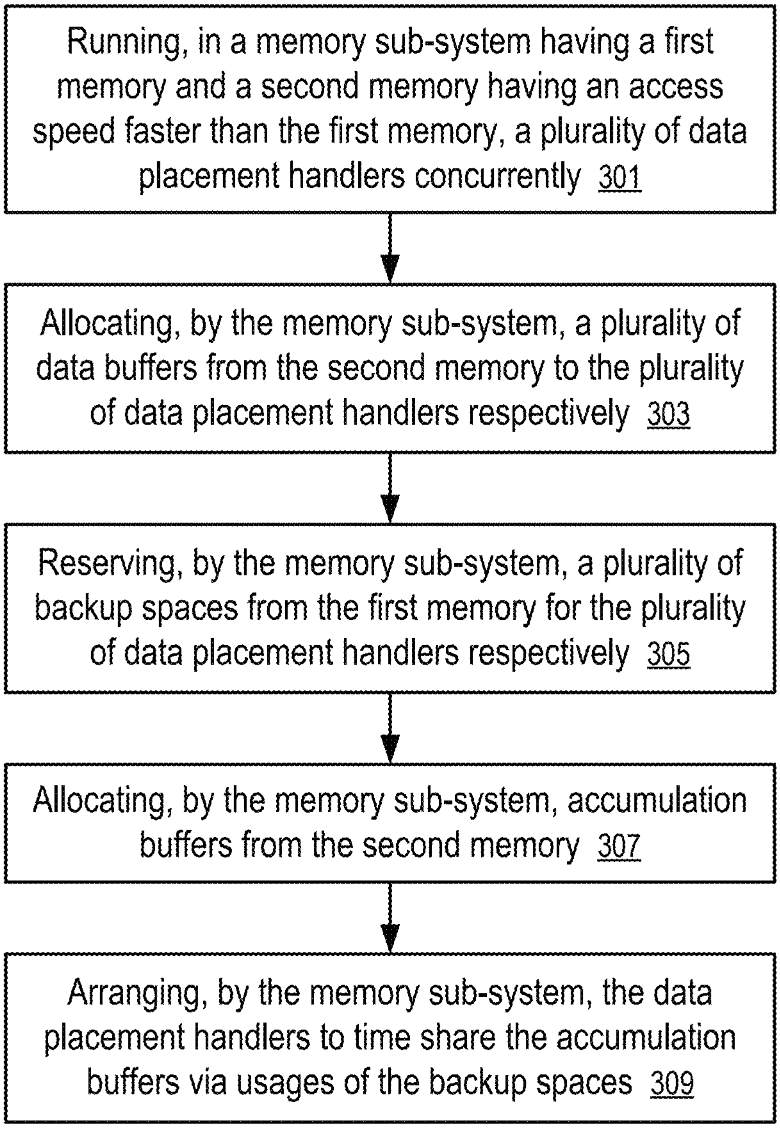
FIG. 7 shows a method to manage buffers of data placement handlers in a memory sub-system according to one embodiment.

FIG. 7 shows a method to manage buffers of data placement handlers in a memory sub-system according to one embodiment. The method of FIG. 7 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 7 is performed at least in part by the processing device 118 of the host system 102, the controller 115 of the memory sub-system 101, and/or the local media controller 105 of the memory sub-system 101 in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 7 can be implemented in the computing system 100 of FIG. 1 to dynamic manage allocation and deallocation of an accumulation buffer 155 of a data placement handler 151 of FIG. 2 in a way as illustrated in FIG. 3 to FIG. 6.

At block 301, the method of FIG. 7 includes running, in a memory sub-system 101, a plurality of data placement handlers (e.g., 171, 173, . . . , 175) concurrently. The memory sub-system 101 can have a first memory (e.g., 205) and a second memory (e.g., 201) having an access speed faster than the first memory (e.g., 205).

For example, the first memory is a non-volatile memory 205; and the second memory is a volatile random access memory 201. For example, the non-volatile memory 205 is a NAND memory; the second memory (e.g., 201) is a static random access memory (SRAM) or a dynamic random access memory (DRAM).

At block 303, the method includes allocating, by the memory sub-system 101, a plurality of data buffers 161, 163, . . . , 165 from the second memory (e.g., 201) to the plurality of data placement handlers 171, 173, . . . , 175 respectively.

At block 305, the method includes reserving, by the memory sub-system 101, a plurality of backup spaces 181, 183, . . . , 185 from the first memory 205 for the plurality of data placement handlers 171, 173, . . . , 175 respectively.

For example, the backup spaces 181, 183, . . . , 185 can be configured to store data in a single level cell (SLC) mode; and the memory sub-system 101 can be configured to store host data (e.g., 189) in a mode (e.g., MLC, TLC, QLC, or PLC) having a data storage density higher than the single level cell (SLC) mode.

At block 307, the method includes allocating, by the memory sub-system 101, accumulation buffers 167, . . . , 169 from the second memory 201.

At block 309, the method includes arranging, by the memory sub-system 101, the data placement handlers 171, 173, . . . , 175 to time share the accumulation buffers via usages of the backup spaces 181, 183, . . . , 185.

For example, the data placement handlers 171, 173, . . . , 175 can include a first data placement handler 171 and a second data placement handler 173. The accumulation buffers 167, . . . , 169 can include a first accumulation buffer 167. The backup spaces 181, 183, . . . , 185 can include a first backup space 181 allocated to the first data placement handler 171, and a second backup space 183 allocated to the second data placement handler 173.

The memory sub-system 101 can dynamically deallocate the first accumulation buffer 167 from the first data placement handler 171 and reallocate the first accumulation buffer 167 to the second data placement handler 171.

For example, the method can further include: writing a content (e.g., data 211) of the first accumulation buffer 167 currently allocated to the first data placement handler 171 to the first backup space allocated to the first data placement handler 171 for deallocation of the first accumulation buffer 167 from the first data placement handler 171.

For example, the method can further include: retrieving a content (e.g., data 213) of the second backup space 183 allocated to the second data placement handler 173 into the first accumulation buffer 167 for reallocation of the first accumulation buffer 167 to the second data placement handler 173.

For example, the reallocation of the first accumulation buffer 167 to the second data placement handler 173 can be in response to the second data placement handler 173 performing an operation (e.g., XOR) that involves the use of an accumulation buffer; and the deallocation of the first accumulation buffer 167 from the first data placement handler 171 can be based on a recorded time of last use of accumulation buffer by the first data placement handler 171, or a predicted time of next use of accumulation buffer by the first data placement handler 171, or a combination thereof.

For example, the plurality of data placement handlers 171, 173, . . . , 175 can be reclaim unit handles according to a flexible data placement (FDP) technique, or zone cursors according to a zoned namespace (ZNS) technique.

Optionally, the method can further include: writing contents of the accumulation buffers 167, . . . , 169 currently allocated to a subset of the data placement handlers to a subset of the backup spaces allocated to the subset of the data placement handlers respectively for deallocation of the accumulation buffers 167, . . . , 169 in response to an asynchronous power loss (APL) event. After power restoration, the data (e.g., 215) can be retrieved from the backup spaces (e.g., 185) into the accumulation buffers (e.g., 169) for allocation to the data placement handlers (e.g., 175).

A non-transitory computer storage medium can be used to store instructions programmed to implement the buffer managers 113 in the host system 102 and the memory sub-system 101. When the instructions are executed by the processing device 118, the controller 115, and the processing device 117, the instructions cause the host system 102 and/or the memory sub-system 101 to perform the methods discussed above.

Figure 8:
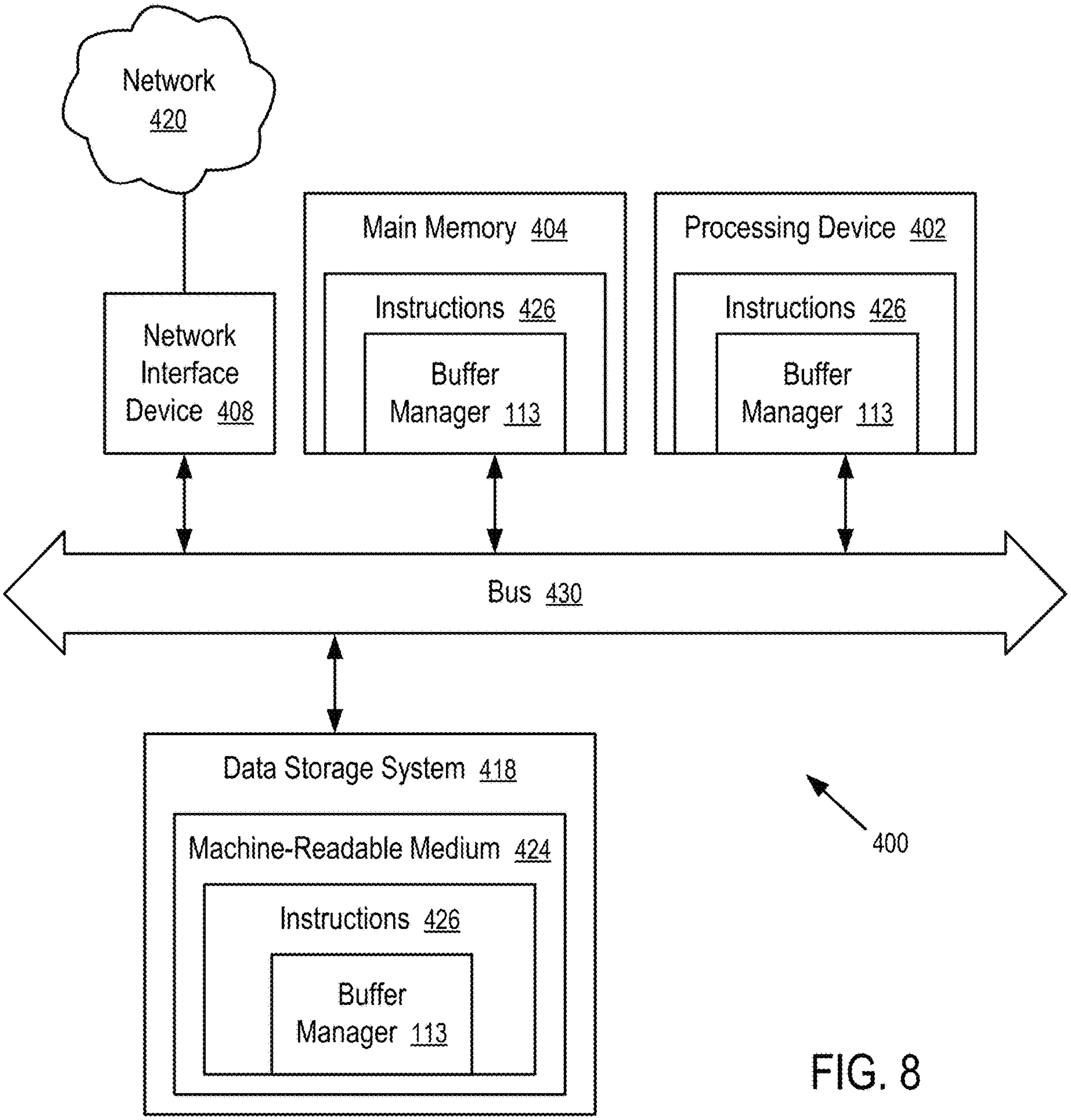
FIG. 8 is a block diagram of an example computer system in which embodiments of the present disclosure can operate.

FIG. 8 illustrates an example machine of a computer system 400 within which a set of instructions, for causing the machine to perform any one or more of the methodologies discussed herein, can be executed. In some embodiments, the computer system 400 can correspond to a host system (e.g., the host system 102 of FIG. 1) that includes, is coupled to, or utilizes a memory sub-system (e.g., the memory sub-system 101 of FIG. 1) or can be used to perform the operations of buffer managers 113 (e.g., to execute instructions to perform operations corresponding to the buffer managers 113 described with reference to FIGS. 1-7). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 101 of FIG. 1.

In one embodiment, the instructions 426 include instructions to implement functionality corresponding to the buffer managers 113 described with reference to FIGS. 1-7. While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system, comprising:

a first memory configured as a non-volatile storage medium of the memory sub-system;

a second memory; and a processing device configured to:

run a plurality of data placement handlers concurrently;

allocate a plurality of data buffers from the second memory to the plurality of data placement handlers respectively;

allocate accumulation buffers from the second memory; and arrange the data placement handlers to time share the accumulation buffers.

2. The memory sub-system of claim 1, wherein the first memory is a non-volatile memory; and the second memory is a volatile memory.

3. The memory sub-system of claim 2, wherein the non-volatile memory is a NAND memory; and the second memory is a static random access memory or a dynamic random access memory.

4. The memory sub-system of claim 3, wherein the processing device is further configured to:

write a content of a first accumulation buffer currently allocated to a first data placement handler to a first backup space allocated to the first data placement handler for deallocation of the first accumulation buffer from the first data placement handler.

5. The memory sub-system of claim 4, wherein the processing device is further configured to:

retrieve a content of a second backup space allocated to a second data placement handler into the first accumulation buffer for reallocation of the first accumulation buffer to the second data placement handler.

6. The memory sub-system of claim 5, wherein the reallocation of the first accumulation buffer to the second data placement handler is in response to the second data placement handler performing an operation that involves an accumulation buffer; and the deallocation of the first accumulation buffer from the first data placement handler is based on a recorded time of last use of accumulation buffer by the first data placement handler, or a predicted time of next use of accumulation buffer by the first data placement handler, or a combination thereof.

7. The memory sub-system of claim 6, wherein the plurality of data placement handlers are reclaim unit handles according to a flexible data placement (FDP) technique, or zone cursors according to a zoned namespace (ZNS) technique.

8. The memory sub-system of claim 6, wherein the processing device is further configured to:

write contents of the accumulation buffers currently allocated to a subset of the data placement handlers to a subset of the backup spaces allocated to the subset of the data placement handlers respectively for deallocation of the accumulation buffers in response to an asynchronous power loss (APL) event.

9. A method, comprising:

running, in a memory sub-system having a first memory and a second memory, a plurality of data placement handlers concurrently;

allocating, by the memory sub-system, a plurality of data buffers from the second memory to the plurality of data placement handlers respectively;

allocating, by the memory sub-system, accumulation buffers from the second memory; and arranging, by the memory sub-system, the data placement handlers to time share the accumulation buffers;

wherein the first memory is a non-volatile memory; and the second memory is a volatile memory.

10. The method of claim 9, wherein the non-volatile memory is a NAND memory; the second memory is a static random access memory or a dynamic random access memory; the backup spaces are configured to store data in a single level cell (SLC) mode; and the memory sub-system is configured to store host data in a mode having a data storage density higher than the single level cell (SLC) mode.

11. The method of claim 9, further comprising:

writing a content of a first accumulation buffer currently allocated to a first data placement handler to a first backup space allocated to the first data placement handler for deallocation of the first accumulation buffer from the first data placement handler.

12. The method of claim 11, further comprising:

retrieving a content of a second backup space allocated to a second data placement handler into the first accumulation buffer for reallocation of the first accumulation buffer to the second data placement handler.

13. The method of claim 12, wherein the reallocation of the first accumulation buffer to the second data placement handler is in response to the second data placement handler performing an operation that involves an accumulation buffer; and the deallocation of the first accumulation buffer from the first data placement handler is based on a recorded time of last use of accumulation buffer by the first data placement handler, or a predicted time of next use of accumulation buffer by the first data placement handler, or a combination thereof.

14. The method of claim 13, wherein the plurality of data placement handlers are reclaim unit handles according to a flexible data placement (FDP) technique, or zone cursors according to a zoned namespace (ZNS) technique.

15. The method of claim 13, further comprising:

writing contents of the accumulation buffers currently allocated to a subset of the data placement handlers to a subset of the backup spaces allocated to the subset of the data placement handlers respectively for deallocation of the accumulation buffers in response to an asynchronous power loss (APL) event.

16. A non-transitory computer storage medium storing instructions which, when executed in a memory sub-system having a first memory and a second memory, cause the memory sub-system to perform a method, comprising:

allocating a plurality of data buffers from the second memory to a plurality of data placement handlers respectively;

allocating accumulation buffers from the second memory; and arranging the data placement handlers to time share the accumulation buffers.

17. The non-transitory computer storage medium of claim 16, wherein the method further comprises:

writing a content of a first accumulation buffer currently allocated to a first data placement handler to a first backup space allocated to the first data placement handler for deallocation of the first accumulation buffer from the first data placement handler.

18. The non-transitory computer storage medium of claim 17, wherein the method further comprises:

retrieving a content of a second backup space allocated to a second data placement handler into the first accumulation buffer for reallocation of the first accumulation buffer to the second data placement handler.

19. The non-transitory computer storage medium of claim 18, wherein the method further comprises:

writing contents of the accumulation buffers currently allocated to a subset of the data placement handlers to a subset of the backup spaces allocated to the subset of the data placement handlers for deallocation of the accumulation buffers in response to an asynchronous power loss (APL) event.

* * * * *